United States Patent
Caputo

(10) Patent No.: US 10,465,855 B2
(45) Date of Patent: Nov. 5, 2019

(54) DRIP RISER AND METHOD OF OPERATION

(71) Applicant: Consolidated Edison Company of New York, Inc., New York, NY (US)

(72) Inventor: Matthew Caputo, Modena, NY (US)

(73) Assignee: CONSOLIDATED EDISON COMPANY OF NEW YORK, INC., New York, NY (US)

(*) Notice: Subject to any disclaimer, the term of this patent is extended or adjusted under 35 U.S.C. 154(b) by 107 days.

(21) Appl. No.: 15/477,254

(22) Filed: Apr. 3, 2017

(65) Prior Publication Data

US 2017/0292658 A1 Oct. 12, 2017

Related U.S. Application Data

(60) Provisional application No. 62/319,413, filed on Apr. 7, 2016.

(51) Int. Cl.
| | | |
|---|---|---|
| *F17D 1/04* | (2006.01) | |
| *F17D 3/14* | (2006.01) | |
| *F16L 55/07* | (2006.01) | |
| *F16T 1/00* | (2006.01) | |

(52) U.S. Cl.
CPC ............. *F17D 3/145* (2013.01); *F16L 55/07* (2013.01); *F16T 1/00* (2013.01); *F17D 1/04* (2013.01)

(58) Field of Classification Search
CPC .... F17D 3/145; F17D 1/04; F16T 1/00; F16L 55/07

USPC .................................................. 137/317, 318
See application file for complete search history.

(56) References Cited

U.S. PATENT DOCUMENTS

| | | | | |
|---|---|---|---|---|
| 2,073,311 A | * | 3/1937 | May .................... | F17D 3/145 137/318 |
| 3,508,290 A | | 4/1970 | Ellis | |
| 3,854,894 A | * | 12/1974 | Klass ..................... | C10L 3/00 137/3 |
| 4,345,613 A | * | 8/1982 | Mills ..................... | F16T 1/00 137/152 |
| 6,053,200 A | * | 4/2000 | Crochet .............. | F16K 11/044 137/557 |
| 2010/0109886 A1 | * | 5/2010 | Kafry .................... | F17D 3/145 340/603 |
| 2016/0369927 A1 | * | 12/2016 | Dicke .................... | F16L 55/07 |

\* cited by examiner

*Primary Examiner* — Ian G Paquette
(74) *Attorney, Agent, or Firm* — Cantor Colburn LLP

(57) ABSTRACT

A system and method for accessing a gas main is provided. The system including a drip riser having an interior portion and a first quick-connect coupler, the first quick-connect coupler being fluidly coupled to the interior portion. A riser attachment device is provided having a second quick-connect coupler, an open end, and a valve disposed between the second quick-connect coupler and the open end. The second quick-connect coupler is configured to removably couple with the first quick-connect coupler. The first quick-connect coupler and second quick-connect coupler cooperate to fluidly couple the open end to the interior portion when the riser attachment device is coupled to the drip riser and the valve is opened.

14 Claims, 4 Drawing Sheets

DRIP RISER AND METHOD OF OPERATION

CROSS REFERENCE TO RELATED APPLICATIONS

This application claims the benefit of U.S. Provisional Application Ser. No. 62/319,413 filed Apr. 7, 2016, the entire disclosure of which is incorporated herein by reference.

BACKGROUND

The subject matter disclosed herein relates to gas distribution system, and in particular to a natural gas distribution system having a drip riser.

Conduits or pipes are used in a variety of applications to either transfer a material, such as a gas or liquid for example, from a first area to a second area. Other applications make use of conduits as a type of shield to protect an object, such as an electrical, telecommunications or other cable for example, from damage. Often, these conduits are located underground, such as beneath roadways or sidewalks for example. Access points to the conduits may be provided, such as through manhole covers for example, to allow service personnel access to the conduits.

One application that makes extensive use of conduits is in the delivery of natural gas from a provider to a residence. Natural gas main conduits are typically installed under a street and have branch connections that couple the gas main to a residence, office building or other facility. Often, the conduits used in a natural gas system are made from nonmetallic-plastic material, such as polyvinyl chloride or polyethylene (PE) for example. The branch natural gas conduits are usually installed underground and have a first valve (sometimes referred to as a curb valve) adjacent the main conduit near the street and a second valve adjacent the gas meter located in or near the residence or building.

It should be appreciated that since the gas being transferred through the conduit contains moisture, water may build up within the conduit, such as through condensation with the walls of the conduit. In some cases, the water within the conduit may build up over time and collect, such as at low points in the conduit. When sufficient water collects, the flow of the natural gas may be interrupted or impeded.

In some natural gas delivery systems, a fitting sometimes referred to as a drip riser may be installed periodically. The drip riser includes a trap that captures water and an access fitting. To check for the presence of water, the service personnel open the access fitting to check for the presence of water. Typically, the access fitting is a threaded plug disposed on an end of a riser pipe. The riser pipe is typically about 1 inch long and extends from the top of the conduit. One issue that arises is that the gas pressure within the conduit may force water out of the riser pipe causing a gas release or a gas liquid spill. Since the liquid may be contaminated, costly cleanup procedures may be needed to remove the gas liquid spill.

Further, in areas prone to flooding or high ground water, sometimes the access fitting may be submerged, such as during a storm for example. Due to the potential for the release of a contaminated liquid or gas, the inspections of these drip risers may be delayed until the water recedes below the top of the riser pipe. As a result, water collects within the conduit in an area that is flooded, the delivery of gas downstream may be interrupted for an undesired period of time.

While existing drip risers for gas delivery systems are suitable for their intended purposes, a need for improvement remains in providing a drip riser system that reduces or eliminates the risk of a liquid spill and allows for inspection of the drip riser in flood or high ground water conditions.

BRIEF DESCRIPTION

According to one aspect of the disclosure a system is provided. The system including a drip riser having an interior portion and a first quick-connect coupler, the first quick-connect coupler being fluidly coupled to the interior portion. A riser attachment device is provided having a second quick-connect coupler, an open end, and a valve disposed between the second quick-connect coupler and the open end. The second quick-connect coupler is configured to removably couple with the first quick-connect coupler. The first quick-connect coupler and second quick-connect coupler cooperate to fluidly couple the open end to the interior portion when the riser attachment device is coupled to the drip riser and the valve is opened.

According to another aspect of the disclosure a method is provided. The method including providing a drip riser with an interior portion coupled to a gas main, the drip riser having a first quick-connect coupler fluidly coupled to the interior portion. A riser attachment device is provided having a second quick-connect coupler, an open end and a valve disposed between the second quick-connect coupler and the open end. The second quick-connect coupler is connected to the first quick-connect coupler to fluidly couple the riser attachment device to the interior portion. The valve is opened.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present invention provide advantages in allowing drip risers in gas distribution systems to be accessed for inspection while reducing or minimizing the risk of a liquid spillage. Further embodiments of the present invention provide further advantages in allowing inspection of a drip riser when the drip riser is submerged under water.

Figure 1:
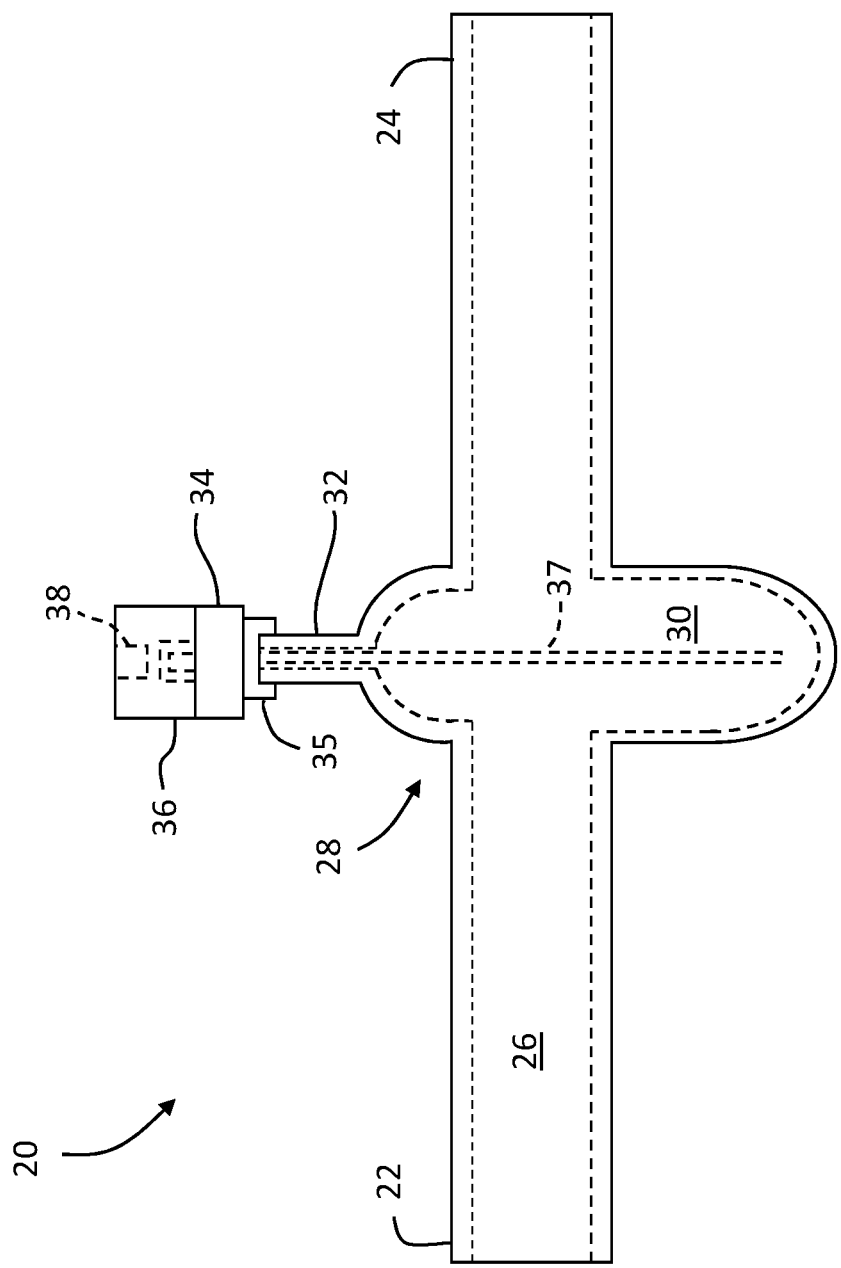
FIG. 1 is a side view of a drip riser in accordance with some embodiments of the invention.

Referring now to FIG. 1, an exemplary drip riser 20 is shown, such as may be used in a natural gas distribution system for example. The drip riser 20 includes a first end 22 and a second end 24 that are configured to couple with conduit of the gas distribution system. As such, the drip riser 20 includes a substantially hollow interior portion 26 that allows the gas to flow from the first end 22 to the second end 24. It should be appreciated that when the gas distribution system is operating normally, the gas within the system flows uninterrupted through the drip riser 20.

Centrally disposed within the drip riser 20 is an access point 28. The access point 28 includes a trap portion 30 disposed on the bottom of the drop riser 20. The trap portion 30 includes a generally hollow well that is configured to capture water that may flow through the interior portion 26. Opposite the trap portion 30, a riser pipe 32 extends through the wall of the drip riser 20. The riser pipe 32 is fluidly coupled to the interior portion 26. As will be discussed in more detail herein, the riser pipe 32 allows service personnel access to the interior of the gas distribution system for inspection or pressure measurement for example.

Coupled to the end of the riser pipe 32 is a male quick-connect coupler 34. As used herein, a "quick-connect coupler" is a hydraulic coupling that allows service personnel to connect and disconnect a corresponding opposing fitting, sometimes referred to as a female fitting, without tools and little or no leakage of gas or fluid from the gas distribution system during the coupling/decoupling process. In the exemplary embodiment, the male quick-connect coupler 34 is a model BH8-61 manufactured by Parker Hannifin Corp. In one embodiment, the quick-connect coupler is made from brass or stainless steel. In one embodiment, the male quick-connect coupler 34 or a fitting 35 includes a conduit or pipe 37 that has an opposite end that extends into the trap portion 30. As will be discussed in more detail below, this facilitates removal of liquid from the trap portion 30 and the interior portion 26.

During normal operation, meaning when an inspection is not being performed for example, a female quick-connect coupler 36 is connected to the male quick-connect coupler 34. The female quick-connect coupler 36 includes a plug 38 to prevent liquids or gases from flowing through the quick-connect couplers 34, 36. In the exemplary embodiment, the plug 38 is recessed into the top of the female quick-connect coupler 36.

Figure 2:
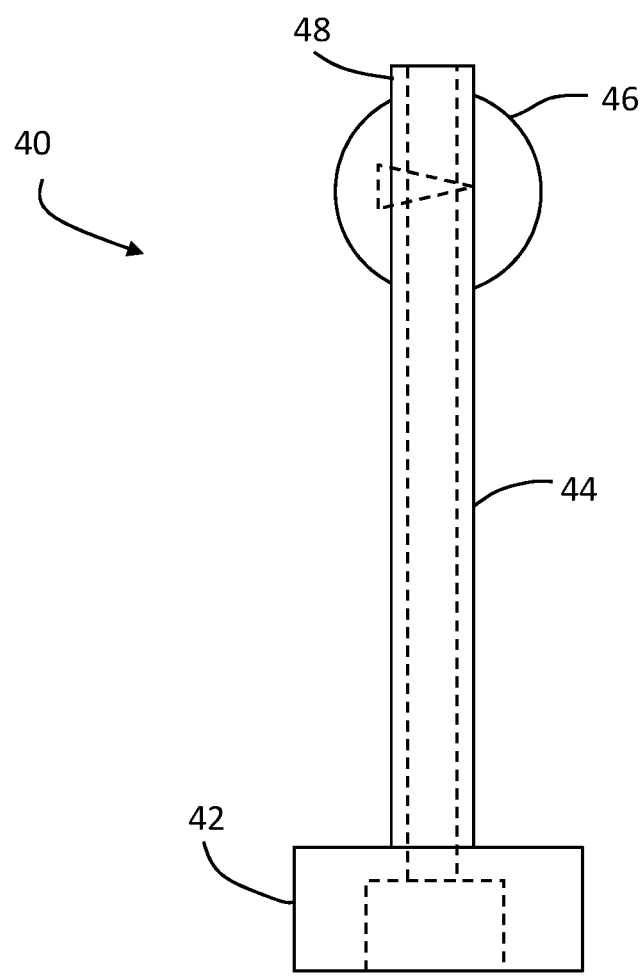
FIG. 2 is a side view of a riser attachment device in accordance with some embodiments of the invention.

Periodically, service personnel may desire to inspect or test the gas distribution system. For example, the service personnel may want to determine if the presence of water or low gas pressure is interfering with use of the gas (e.g. by consumers). It should be appreciated that in some circumstances, the presence of water in the interior portion 26 may prevent the flow of the gas downstream. Referring now to FIG. 2, a riser attachment device 40 is shown for allowing the service personnel access to the interior portion 26.

The riser attachment device 40 includes a female quick-connect coupler 42 that is configured to connect with the male quick-connect coupler 34. Extending from the female quick-connect coupler 42 is a riser pipe 44. It should be appreciated that the riser pipe 44 may be any desired length suitable for the environment in which the drip riser 20 is located. For example, it may be desired to have the riser pipe 44 to be long enough to extend above the access point (e.g. manhole cover) to avoid releasing gas into a confined space when intentional venting is performed. The riser pipe 44 may further be selected to have a length suitable to extend above a water level if the drip riser 20 is submerged under water. Coupled to the riser pipe 44 is a valve 46, such as but not limited to a ball valve, ball-cock valve, a butterfly valve, a gate valve or a needle valve for example. In one embodiment, a check valve may be arranged to prevent external contaminants from entering the gas distribution system.

Figure 4:
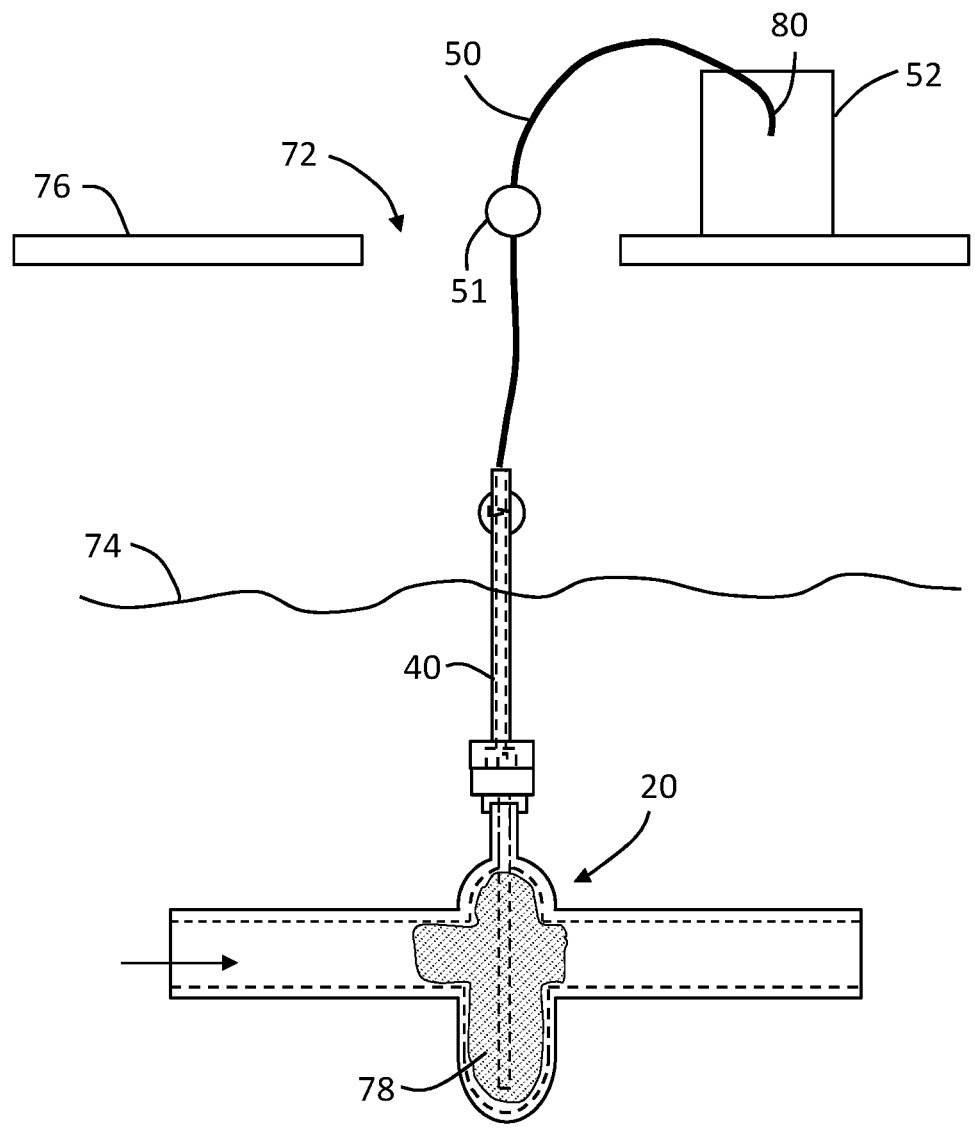
FIG. 4 is a side view of the drip riser of FIG. 1 with the riser attachment device of FIG. 2.

The end 48 of the riser attachment device 40 includes an opening 50, such that when the valve 46 is opened, the interior portion 26 is fluidly coupled to the environment. In an embodiment, the end 48 is configured to couple with a conduit, such as a hose 50 (FIG. 4) to fluidly couple the riser attachment device 40 to a container 52 (FIG. 4). In one embodiment, a pump 51 may be coupled to the hose to facilitate removal of the liquid.

Figure 3:
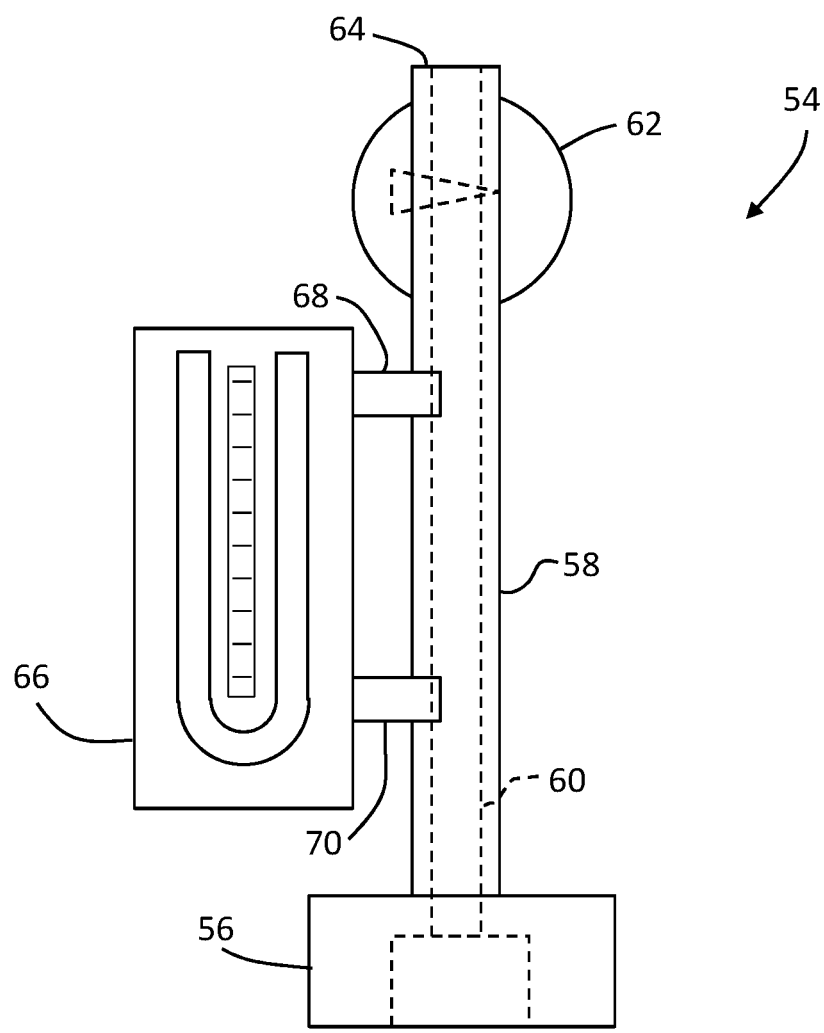
FIG. 3 is a side view of a riser attachment device for measuring pressure in accordance with some embodiments of the invention.

Referring now to FIG. 3, another riser attachment device 54 is shown. In this embodiment, the riser attachment device 54 includes a female quick-connect coupler 56 that is configured to connect with the male quick-connect coupler 34. Extending from the female quick-connect coupler 56 is a riser pipe 58. It should be appreciated that the riser pipe 58 may be any desired length suitable for the environment in which the drip riser 20 is located. The riser pipe 58 includes an internal passage 60 that is fluidly coupled to the female quick-connect coupler 56 such that when the female quick-connect coupler 56 is coupled to the male quick-connect coupler 34, the internal passage 60 is fluidly coupled to the interior portion 26. A valve 62 is coupled to the riser pip 58 to selectively allow gas or liquids to flow from the interior portion 26 through the end 64. As discussed herein, the end 64 may be configured to receive a conduit or a hose 50 (FIG. 4) to direct fluids into a container 52.

In this embodiment, the riser attachment device 54 includes a pressure gauge 66. In an embodiment, the pressure gauge 66 is a u-shaped manometer that is fluidly coupled to the riser tube 58 by connections 68, 70. It should be appreciated that in other embodiments, other types of pressure gauges may be used, such as but not limited to a McLeod gauge, an aneroid gauge, a Bourdon gauge, a magnetic coupling gauge, a spinning rotor gauge, an electronic pressure gauge (piezoresistive strain, piezoelectric, capacitive, magnetic, optical, potentiometric or resonant), a thermal conductivity gauge or an ionization gauge. The pressure gauge 66 is positioned between the valve 62 and the female quick-connect coupler 56, such that when the riser attachment device 54 is connected to the drip riser 20, the pressure gauge 66 may be used to measure both the line pressure (with the valve 62 closed) and the so-called "blow" pressure (with the valve 62 open).

It should be appreciated that the length of the riser tube 58 may be selected to allow the pressure gauge 66 to be positioned above a water level in the event the drip riser 20 is submerged or partially submerged in water.

Referring now to FIG. 4, an embodiment is shown for a method of inspecting a drip riser that is submerged under water. This method may be used for example when gas delivery service is interrupted, such as due to the collecting of water 78 that blocks or restricts the flow of gas. It should be appreciated that while the illustrated embodiment is described in reference to the drip riser 20 being submerged, this is for exemplary purposes and the claimed invention should not be so limited. In other embodiments, this method may be performed on a drip riser 20 that is not submerged.

Upon detecting of a service problem (e.g. service interruption, low gas flow rate, low pressure, etc.) service personnel may be dispatched to the area to identify and resolve the problem. The service personnel first open the access point 72 (e.g. a manhole cover) to gain access to the chamber or area in which the drip riser 20 is located. The service personnel then remove the female quick-connect coupler 36 (FIG. 1) to gain access to the male quick-connect coupler 34. It should be appreciated that when the female quick-connect coupler 36 is removed, the male quick-connect coupler 34 automatically closes to avoid releasing gases or fluids from the interior portion 26. The riser attachment device 40, 54 is attached to the male quick-connect coupler 34. The riser attachment device 40, 54 is selected having a riser pipe 44, 58 having a length sufficient to position the end 48, 64 above the water level 74. In one embodiment, the riser pipe 44, 58 has a length sufficient to position the end 48, 64 through the access point 74 and above ground level 76.

In an embodiment, a conduit or hose 50 is coupled to the end 48, 64 with an opposite end 80 positioned in a container 52. The valve 46, 62 is the opened. It should be appreciated that where water 78 is hindering the flow of gas, the gas pressure within the gas main will cause the water 78 to flow into the riser attachment device 40 and through the hose 50 into the container 52. Typically, the pressure within a gas main is about 4.5-12 inches of water (0.2-0.43 psi). As a result, the liquid in the drip riser 20 may be removed and contained to allow for proper disposal with reduced risk of spillage. It should be appreciated that embodiments of the invention provide advantages in allowing for gas distribution systems to be serviced even when the gas main or drip riser is submerged under water. Embodiments of the invention provide still further advantages in the venting of gas from the drip riser above ground level and avoid venting gas into an enclosed space.

Once the liquid is removed, or the pressure determined, the valve 46, 62 is closed preventing further venting of gas. The female quick-connect coupler 42, 56 is decoupled from the male quick-connect coupler 34 and removed through the access point 72. It should be appreciated that when the female quick-connect coupler 42, 56 is decoupled, the male quick-connect coupler 34. The female quick-connect coupler 36 is then reinstalled and the access point 78 may be secured or closed.

It should be appreciated that while embodiments herein refer to using the drip riser 20 and riser attachment device 40, 54 for removing liquids, this is for exemplary purposes and the claimed invention should not be so limited. In other embodiments, the drip riser and riser attachment device may be used for: gas pressure check; gas sampling for proper percentage of gas mixture; odorant check; for setting up temporary bypass or temporary regulator station to back feed pressure problem areas; using bypass hoses to connect houses for temporary bypass instead of compression coupling. It should be appreciated that all of these embodiments may be performed in flooded or submerged areas. Further, while embodiments herein describe the drip riser and riser attachment device as operating on low pressure, this is for exemplary purposes and it is contemplated that the drip riser and riser attachment device may be used on intermediate (1-5 psi), medium (3-15 psi) or high (25-99 psi) pressure systems as well.

Further, it should be appreciated that while embodiments herein describe the male quick-connect coupler as being coupled to the drip riser and the female quick-connect coupler as being connected to the riser attachment device, this is for exemplary purposes and the claimed invention should not be so limited. In other embodiments, the position of the quick-connect couplers is reversed, with the male quick-connect coupler being coupled to the riser attachment device and the female quick-connect coupler being coupled to the drip riser.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system comprising:
    a drip riser having an interior portion and a first quick-connect coupler, the first quick-connect coupler being fluidly coupled to the interior portion;
    a riser attachment device having a second quick-connect coupler, an open end, and a valve disposed between the second quick-connect coupler and the open end, the second quick-connect coupler being configured to removably couple with the first quick-connect coupler, the first quick-connect coupler and second quick-connect coupler cooperating to fluidly couple the open end to the interior portion when the riser attachment device is coupled to the drip riser and the valve is opened; and
    a third quick-connect coupler having a first end configured to removably couple with the first quick-connect coupler and an opening in a second opposing end, the third quick-connect coupler further having a plug sized to couple to the opening and prevent fluid flow through the third quick-connect coupler when the third quick-connect coupler is couples to the first quick-connect coupler.

2. The system of claim 1 wherein the plug is recessed in the opening.

3. The system of claim 1 wherein the first quick-connect coupler is a male quick-connect coupler.

4. The system of claim 1 wherein the second quick-connect coupler is a female quick-connect coupler.

5. The system of claim 1 further comprising a riser pipe disposed between the second quick-connect coupler and the open end.

6. The system of claim 5 wherein the riser pipe has a length sized to position the open end outside of an access point.

7. The system of claim 5 further comprising a pressure gauge operably coupled to the riser pipe between the valve and the second quick-connect coupler.

8. A method comprising:
providing a drip riser with an interior portion coupled to a gas main, the drip riser having a first quick-connect coupler fluidly coupled to the interior portion;
providing a riser attachment device having a second quick-connect coupler, an open end and a valve disposed between the second quick-connect coupler and the open end;
connecting the second quick-connect coupler to the first quick-connect coupler to fluidly couple the riser attachment device to the interior portion;
opening the valve;
coupling a conduit to the open end and fluidly coupling an opposing end of the conduit to a container;
transferring a liquid from the interior portion into the container; and
removing a third quick-connect coupler from the first quick-connect coupler prior to coupling the second quick-connect coupler to the first quick-connect coupler, the third quick-connect coupler having a plug recessed in an end.

9. The method of claim 8 further comprising coupling the open end to a house gas system.

10. The method of claim 8 further comprising performing an odorant check.

11. The method of claim 8 further comprising measuring a first pressure in a riser pipe disposed between the valve and the second quick-connect coupler, the first pressure being measured prior to opening the valve.

12. The method of claim 11 further comprising measuring a second pressure in the riser pipe after the valve is opened.

13. The method of claim 8 further comprising disposing the open end outside of an access point.

14. The method of claim 13 further comprising venting gas from the interior portion.

* * * * *